United States Patent [19]

Tarumi et al.

[11] Patent Number: 5,976,407
[45] Date of Patent: Nov. 2, 1999

[54] ELECTRO-OPTICAL LIQUID-CRYSTAL DISPLAY

[75] Inventors: Kazuaki Tarumi, Seeheim; Andreas Beyer, Hanau; Volker Reiffenrath, Rossdorf, all of Germany

[73] Assignee: Merck Patent Gesellschaft mit Beschrankter Haftung, Germany

[21] Appl. No.: 09/030,828

[22] Filed: Feb. 26, 1998

[30] Foreign Application Priority Data

Feb. 27, 1997 [DE] Germany ............................ 197 07 807

[51] Int. Cl.$^6$ .......................... C09K 19/52; C09K 19/34; C09K 19/30
[52] U.S. Cl. ................................ 252/299.01; 252/299.61; 252/299.62; 252/299.63; 252/299.64; 252/299.67
[58] Field of Search ......................... 252/299.01, 299.61, 252/299.62, 299.63, 299.64, 299.67; 349/132, 184

[56] References Cited

U.S. PATENT DOCUMENTS

| 5,032,213 | 7/1991 | Goto et al. .......................... 252/299.63 |
|---|---|---|
| 5,238,602 | 8/1993 | Petrzilka et al. .................... 252/299.65 |
| 5,487,845 | 1/1996 | Reiffenrath et al. ............... 252/299.63 |
| 5,536,442 | 7/1996 | Reiffenrath et al. ............... 252/299.01 |
| 5,576,867 | 11/1996 | Baur et al. ................................ 359/87 |
| 5,598,285 | 1/1997 | Kondo et al. ............................. 349/39 |
| 5,641,249 | 6/1997 | Reiffenrath et al. ............... 252/299.61 |

FOREIGN PATENT DOCUMENTS 2310669  3/1997  United Kingdom .

*Primary Examiner*—Shean C. Wu
*Attorney, Agent, or Firm*—Millen, White, Zelano, & Branigan, P.C.

[57] ABSTRACT

Electro-optical liquid-crystal displays having a realignment layer for realigning the liquid crystals whose field has a significant component parallel to the liquid-crystal layer and which comprises a liquid-crystalline medium of positive dielectric anisotropy. The medium comprises at least one mesogenic compound and at least one bisalkenyl compound of formula I*.

18 Claims, No Drawings

ELECTRO-OPTICAL LIQUID-CRYSTAL DISPLAY

The invention relates to an electro-optical liquid-crystal display having a realignment layer for realigning the liquid crystals whose field has a significant component parallel to the liquid-crystal layer and which comprises a liquid-crystalline medium of positive dielectric anisotropy, where the medium comprises at least one mesogenic compound containing a 3,4,5-trifluorophenyl group and at least one bisalkenyl compound of the formula I*.

BACKGROUND OF THE INVENTION

In conventional liquid-crystal displays (TN, STN, OMI or AMD-TN), the electric fields for realignment are generated essentially perpendicular to the liquid-crystal layer.

International Patent Application WO 91/10936 discloses a liquid-crystal display in which the electric signals are generated in such a way that the electric fields have a significant component parallel to the liquid-crystal layer (IPS, in-plane switching). The principles of operating such a display are described, for example, by R. A. Soref in Journal of Applied Physics, vol. 45, No. 12, pp. 5466–5468 (1974).

EP 0 588 568 discloses various ways of addressing a display of this type.

These IPS displays can be operated with liquid-crystalline materials either of positive or of negative dielectric anisotropy ($\Delta\epsilon \neq 0$). However, using the materials known hitherto, relatively high threshold voltages and long response times are reached in IPS displays. In addition, the problem of crystallization of the liquid-crystal medium at low temperatures can occur in IPS displays containing materials known hitherto. The object was therefore to indicate liquid-crystalline materials which are suitable for achieving relatively low threshold voltages and short response times in IPS displays and which, in particular, have an improved low-temperature shelf life.

SUMMARY OF THE INVENTION

Surprisingly, this object has been achieved by the use of liquid-crystalline materials comprising at least one compound of formula I containing a 3,4,5-trifluorophenyl group and at least one compound of the formula I*.

Compounds of the formula I are disclosed, for example, in EP 0 387 032 and EP 0 441 932. Compounds of the formula I* are encompassed by the broad generic formula in EP 0 168 683.

However, there is no indication in the documents mentioned above that the threshold voltages and the response times of IPS displays can be improved with the aid of these substances. The novel IPS mixtures are distinguished by their relatively high clearing points and low rotational viscosity values and their increased stability to crystallization at low temperatures.

The invention therefore relates to an electro-optical liquid-crystal display having a realignment layer for realigning the liquid crystals whose field has a significant component parallel to the liquid-crystal layer and which contains a liquid-crystalline medium of positive dielectric anisotropy, where the medium comprises at least one compound of the formula I

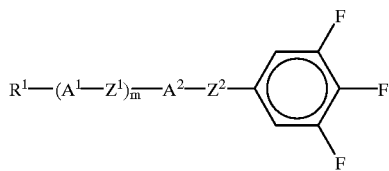

in which
$R^1$ is H, an alkyl or alkenyl radical having 1 to 15 carbon atoms which is unsubstituted, monosubstituted by CN or $CF_3$ or at least monosubstituted by halogen, where one or more $CH_2$ groups in these radicals may also, in each case independently of one another, be replaced by —O—, —S—, —CO—, —CO—O—, —O—CO— or —O—CO—O— in such a way that O atoms are not linked directly to one another, $A^1$ and $A^2$ are each, independently of one another, a
(a) trans-1,4-cyclohexylene radical or 1,4-cyclohexenylene radical, in which, in addition, one or more non-adjacent $CH_2$ groups may be replaced by —O— and/or —S—,
(b) 1,4-phenylene radical, in which, in addition, one or two CH groups may be replaced by N,
(c) radical from the group consisting of 1,4-dicyclo(2,2,2)octylene, piperidine-1,4-diyl, naphthalene-2,6-diyl, decahydronaphthalene-2,6-diyl and 1,2,3,4-tetrahydronaphthalene-2,6-diyl, where the radicals (a) and (b) may be substituted by one or two fluorine atoms, $Z^1$ and $Z^2$ are each, independently of one another, —CO—O—, —O—CO—, —CH$_2$O—, —OCH$_2$—, —CH$_2$CH$_2$—, —CH=CH—, —C≡C—, or a single bond, or one of the radicals $Z^1$ and $Z^2$ is —(CH$_2$)$_4$— or —CH=CH—CH$_2$CH$_2$—, and m is 0, 1 or 2, and at least one compound of the formula I*

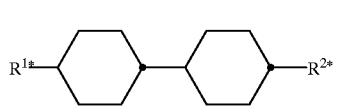

in which
$R^{1*}$ and $R^{2*}$ are each, independently of one another, 1E-alkenyl or 3E-alkenyl having 2–7 carbon atoms.
Preferred embodiments are IPS displays where
the medium additionally comprises at least one compound of the formula II

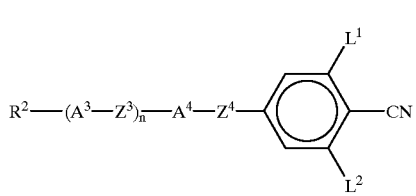

in which
$L^1$ and $L^2$ are each, independently of one another, H or F, $R^2$ is as defined for $R^1$, $A^3$ and $A^4$ are each, independently, as defined for $A^1$ and $A^2$, $Z^3$ and $Z^4$ are each, independently of one another, as defined for $Z^1$ and $Z^2$, and n is 0, 1 or 2, the medium additionally comprises at least one compound of the formula III

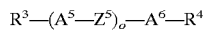   III in which $R^3$ and $R^4$ are each, independently of one another, as defined for $R^1$, $A^5$ and $A^6$ are each, independently, as defined for $A^1$ and $A^2$, $Z^5$ is in each case, independently of the others, as defined for $Z^1$ and $Z^2$, and o is 1, 2 or 3;

m the medium comprises at least one compound of the formula IV

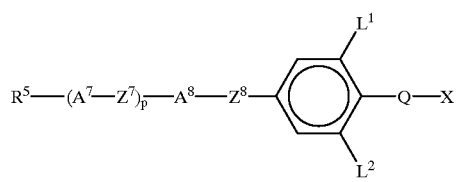   IV in which $R^5$ is as defined for $R^1$, $A^7$ and $A^8$ are each, independently of one another, as defined for $A^1$ and $A^2$, $Z^7$ and $Z^8$ are each, independently of one another, as defined for $Z^1$ and $Z^2$, $L^1$ and $L^2$ are each, independently of one another, H or F, Q is a polyfluoroalkylene radical of the formula

in which q is 0 or 1 r is 0 or an integer between 1 and 6 and s is an integer between 1 and 6, x is H, F or Cl, and p is 0, 1 or 2.

Preference is furthermore given to an IPS display in which the pixels are addressed by means of an active matrix.

The invention furthermore relates to a liquid-crystalline medium of positive dielectric anisotropy which comprises at least one compound of the formula I and at least one compound of the formula I*, in particular which comprises

| from 10 to 60% by weight, | preferably from 30 to 60% by weight, of at least one compound of the formula I, |
|---|---|
| from 5 to 40% by weight, | preferably from 10 to 25% by weight, of at least one compound of the formula I*, |
| from 0 to 40% by weight, | preferably from 0 to 25% by weight, of at least one compound of the formula II, |
| from 0 to 30% by weight, | preferably from 0 to 15% by weight, of at least one compound of the formula III, and |
| from 5 to 50% by weight, | preferably from 10 to 30% by weight, of a compound of the formula IV |

The novel liquid-crystalline medium preferably comprises:

at least one compound selected from the formulae Ia and/or Ib

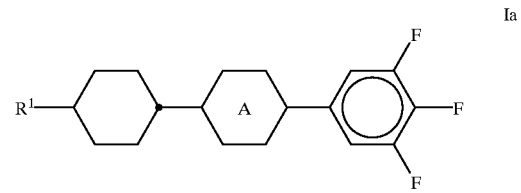

Ia

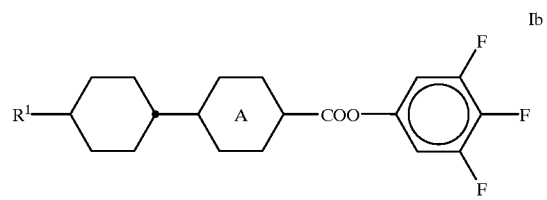

Ib at least one compound selected from the formulae I*a to I*c

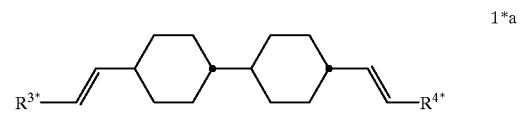

1*a

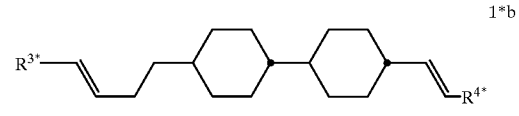

1*b

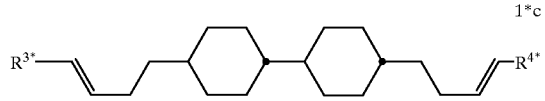

1*c where $R^{3*}$ and $R^{4*}$ are each, independently of one another, H, $CH_3$, $C_2H_s$ or n—$C_3H_7$.

Preferred compounds are compounds of the formula I*a and compounds in which $R^{3*}$ and $R^{3*}$ are H, $CH_3$ or $C_2H_5$.

Preference is furthermore given to compounds of the formulae I*a and I*c in which $R^{3*}$ and $R^{4*}$ are identical.

Particularly, preferred additional compounds include:

at least one compound selected from the formulae IIa to IId

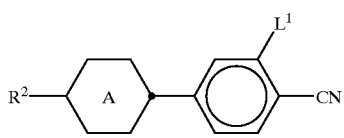
IIa

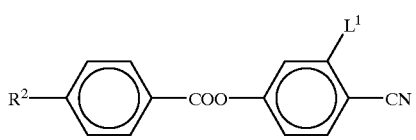
IIb

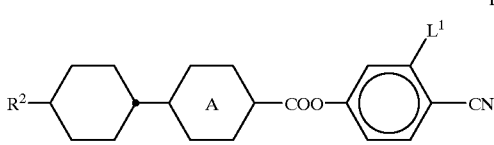
IIc

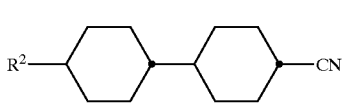
IId in a particularly preferred form, at least one compound of the formula IIa1

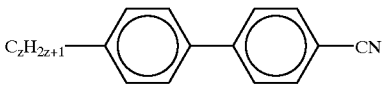
IIa1 in which z is 1–12;

at least one compound selected from the formulae IIIa, IIIb and IIIc,

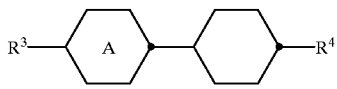
IIIa

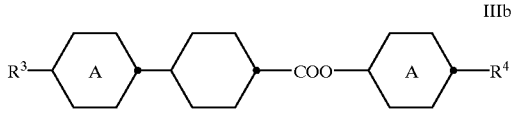
IIIb

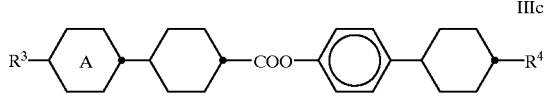
IIIc and if desired, at least one compound selected from the formulae IVa and IVb,

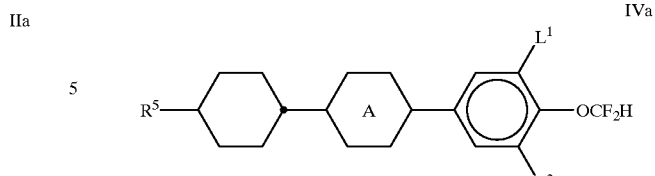
IVa

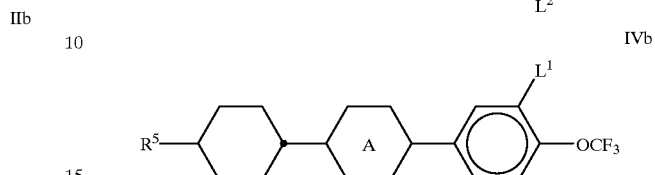
IVb in which

is in each case

 , 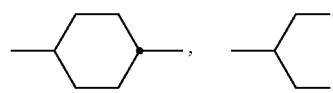 ,

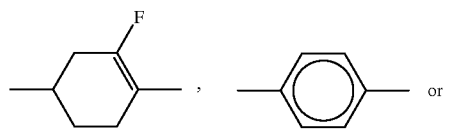 ,  or

and $R^1$, $R^2$, $R^3$, $R^4$, $R^5$, $L^1$ and $L^2$ are each as defined above.

In a particularly preferred embodiment, the novel media comprise at least one compound of the formula Ia in which

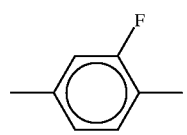 is 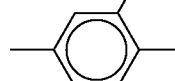

and at least one compound of the formula I*a and/or I*c.

In a further preferred embodiment, the novel media comprise at least one compound of the formula Ia and at least one compound of the formula Ib and a compound of the formula I*, preferably I*a, I*b or I*c.

The novel liquid-crystalline media generally have a birefringence ($\Delta n$)<0.12, preferably from 0.05 to 0.11, in particular from 0.07 to 0.10.

The viscosity (at 20° C.) of the novel mixtures is generally less than 30 mm$^2 \cdot$s$^{-1}$, in particular from 15 to 25 mm$^2 \cdot$s$^{-1}$. The specific resistivity of the novel materials at 20° C. is generally from $5 \times 10^{10}$ to $5 \times 10^{13}$ $\Omega \cdot$cm, particularly preferably from $5 \times 10^{11}$ to $5 \times 10^{12}$ $\Omega \cdot$cm. The rotational viscosity of the novel mixtures at 20° C. is generally less than 150 mpa·s, in particular from 50 to 100 mp·as.

It has been found that even a relatively small proportion of compounds of the formulae I* and I in a mixture with conventional liquid-crystal materials, but in particular with one or more compounds of the formula II, III and/or IV, results in a significant lowering of the threshold voltage, in favorable levels of rotational viscosity γ, and in fast response times, while at the same time broad nematic phases having low smecticnematic transition temperatures are observed. The compounds of the formulae I*, I to IV are colorless stable and readily miscible with one another and with other liquid-crystal materials.

The term "alkyl" covers straight-chain and branched alkyl groups having 1–7 carbon atoms, in particular the straight-chain groups methyl, ethyl, propyl, butyl, pentyl, hexyl and heptyl. Alkyl groups having 2–5 carbon atoms are generally preferred.

The term "alkenyl" covers straight-chain and branched alkenyl groups having 2–7 carbon atoms, in particular the straight-chain groups. In particular, alkenyl groups are $C_2$–$C_7$-1E-alkenyl, $C_4$–$C_7$-3E-alkenyl, $C_5$–$C_7$-4-alkenyl, $C_6$–$C_7$-5-alkenyl and $C_7$-6-alkenyl, in particular $C_2$–$C_7$-1E-alkenyl, $C_4$–$C_7$-3E-alkenyl and $C_5$–$C_7$-4-alkenyl. Examples of preferred alkenyl groups are vinyl, 1E-propenyl, 1E-butenyl, 1E-pentenyl, 1E-hexenyl, 1E-heptenyl, 3E-butenyl, 3E-pentenyl, 3E-hexenyl, 3E-heptenyl, 4-pentenyl, 4Z-hexenyl, 4E-hexenyl, 4Z-heptenyl, 5-hexenyl, 6-heptenyl and the like. Groups having 2 to 5 carbon atoms are generally preferred.

The term "fluoroalkyl" preferably covers straight-chain groups having a terminal fluorine atom, i.e. fluoromethyl, 2-fluoroethyl, 3-fluoropropyl, 4-fluorobutyl, 5-fluoropentyl, 6-fluorohexyl and 7-fluoroheptyl. However, other positions of the fluorine are not excluded.

The term "oxaalkyl" (i.e., where a $CH_2$ group is replaced with —O—) preferably covers straight-chain radicals of the formula $C_nH_{2n+1}$—O—$(CH_2)_m$- in which n and m are each, independently of one another, from 1 to 6. Preferably, n=1 and m is from 1 to 6.

Through a suitable choice of the meanings of $R^1$ and $R^2$–$R^5$, when the compounds containing such groups are present, the response times, the threshold voltage, the steepness of the transmission characteristic lines, etc., can be modified as desired. For example, 1E-alkenyl radicals, 3E-alkenyl radicals, 2E-alkenyloxy radicals and the like generally result in shorter response times, improved nematic tendencies and a higher ratio between the elastic constants $k_{33}$ (bend) and $k_{11}$ (splay) compared with alkyl and alkoxy radicals. 4-Alkenyl radicals, 3-alkenyl radicals and the like generally result in lower threshold voltages and smaller values of $k_{33}/k_{11}$ compared with alkyl and alkoxy radicals.

A —$CH_2CH_2$— group in $Z^1$, $Z^2$, $Z^3$, $Z^4$, $Z^5$, $Z^7$ and/or $Z^8$ generally results in higher values of $k_{33/k11}$ compared with a single covalent bond. Higher values of $k_{33/k11}$ facilitate, for example, flatter transmission characteristic lines in TN cells having a 90° twist (for achieving grey shades) and steeper transmission characteristic lines in STN, SBE and OMI cells (greater multiplexibility), and vice versa.

The optimum mixing ratio between the compounds of the formulae I*, I and II+III+IV depends substantially on the desired properties, on the choice of the components of the formulae I*, I, II, III and/or IV and on the choice of any other components present. Suitable mixing ratios within the abovementioned range can easily be determined from case to case.

The total amount of compounds of the formulae I*, I to IV in the novel mixtures is not crucial. The mixtures preferably comprise 50–90% by weight of compounds of the formulae I, I* and IV. The mixtures may also contain one or more further components in order to optimize various properties.

However, the observed effect on the response times and the threshold voltage is generally higher the greater the total concentration of compounds of the formulae I*, I and IV.

In a particularly preferred embodiment, the novel media comprise compounds of the formula IV in which Q—X is $OCF_3$ or $OCHF_2$. A favorable synergistic effect with the compounds of the formula I*, I and II can also result in particularly advantageous properties.

The novel liquid-crystalline media preferably comprise 2 to 40, in particular 4 to 30, components as further constituents besides one or more compounds of the formulae I*, I, II, III and IV. These media very particularly preferably comprise 7 to 25 components besides one or more compounds according to the invention. These further constituents are preferably selected from nematic or nematogenic (monotropic or isotropic) substances, in particular substances from the classes of the azoxybenzenes, benzylideneanilines, biphenyls, terphenyls, phenyl or cyclohexyl benzoates, phenyl or cyclohexyl esters of cyclohexanecarboxylic acid, phenyl or cyclohexyl esters of cyclohexylbenzoic acid, phenyl or cyclohexyl esters of cyclohexylcyclohexanecarboxylic acid, cyclohexylphenyl esters of benzoic acid, of cyclohexanecarboxylic acid and of cyclohexylcyclohexanecarboxylic acid, phenylcyclohexanes, cyclohexylbiphenyls, phenylcyclohexylcyclohexanes, cyclohexylcyclohexanes, cyclohexylcyclohexylcyclohexenes, 1,4-bis-cyclo-(hexylbenzenes, 4,4'-bis-cyclohexylbiphenyls, phenyl- or cyclohexylpyrimidines, phenyl- or cyclo-hexylpyridines, phenyl- or cyclohexyldioxanes, phenyl- or cyclohexyl-1,3-dithianes, 1,2-diphenylethanes, 1,2-di-cyclohexylethanes, 1-phenyl-2-cyclohexylethanes, 1-cyclohexyl-2-(4-phenyl-(cyclohexyl)ethanes, 1-cyclohexyl-2-biphenylylethanes, 1-phenyl-2-cyclohexylphenylethanes optionally halogenated stilbenes, benzyl phenyl ethers, tolans and substituted cinnamic acids. The 1,4-phenylene groups in these compounds may also be fluorinated.

The most important compounds suitable as further constituents of novel media can be characterized by the formulae 1, 2, 3, 4 and 5:

| | |
|---|---|
| R'—L—E—R" | 1 |
| R'—L—COO—E—R" | 2 |
| R'—L—OOC—E—R" | 3 |
| R'—L—CH$_2$CH$_2$—E—R" | 4 |
| R'—L—C≡C—E—R" | 5 |

In the formulae 1, 2, 3, 4 and 5, L and E, which may be identical or different, are in each case, independently of one another, a bivalent radical from the group formed by -Phe-, -Cyc-, -Phe-Phe-, -Phe-Cyc-, -Cyc-Cyc-, -Pyr-, -Dio-, -G-Phe- and -G-Cyc- and their mirror images, where Phe is unsubstituted or fluorine-substituted 1,4-phenylene, Cyc is trans-1,4-cyclohexylene or 1,4-cyclohexylene, Pyr is pvrimidine-2,5-diyl or pyridine-2,5-diyl, Dio is 1,3-dioxane-2,5-diyl and G is 2-(trans-1,4-cyclohexyl)ethyl, pyrimidine-2,5-diyl, pyridine-2,5-diyl or 1,3-dioxane-2,5-diyl.

One of the radicals L and E is preferably Cyc, Phe or Pyr. E is preferably Cyc, Phe or Phe-Cyc. The novel media preferably comprise one or more components selected from the compounds of the formulae 1, 2, 3, 4 and 5 in which L and E are selected from the group consisting of Cyc, Phe and Pyr and simultaneously one or more components selected from the compounds of the formulae 1, 2, 3, 4 and 5 in which one of the radicals L and E is selected from the group consisting of Cyc, Phe and Pyr and the other radical is selected from the group consisting of -Phe-Phe-, -Phe-Cyc-, -Cyc-Cyc-, -G-Phe- and -G-Cyc-, and optionally one or more components selected from the compounds of the formulae 1, 2, 3, 4 and 5 in which the radicals L and E are selected from the group consisting of -Phe-Cyc-, -Cyc-Cyc-, -G-Phe- and -G- Cyc-.

In a smaller sub-group of the compounds of the formulae 1, 2, 3, 4 and 5, R' and R" are in each case, independently of one another, alkyl, alkenyl, alkoxy, alkoxyalkyl, alkenyloxy or alkanoyloxy having up to 8 carbon atoms. This smaller sub-group is called group A below, and the compounds are labeled with the sub-formulae 1a, 2a, 3a, 4a and 5a. In most of these com- pounds, R' and R" are different from one another, one of these radicals usually being alkyl, alkenyl, alkoxy or alkoxyalkyl.

In another smaller sub-group of the compounds of the formulae 1, 2, 3, 4 and 5 which is known as group B, R" is —F, —Cl, —NCS or —(O)$_i$CH$_{3-(k+1)}$F$_k$Cl$_1$, where i is 0 or 1, and k+1 is 1, 2 or 3; the compounds in which R" has this meaning are labeled with the sub-formulae 1b, 2b, 3b, 4b and 5b. Particular preference is given to those compounds of the sub-formulae 1b, 2b, 3b, 4b and 5b in which R" is —F, —Cl, —NCS, —CF$_3$, —OCHF$_2$ or —OCF$_3$.

In the compounds of the sub-formulae 1b, 2b, 3b, 4b and 5b, R' is as defined for the compounds of the sub-formulae 1a–5a and is preferably alkyl, alkenyl, alkoxy or alkoxyalkyl.

In a further smaller sub-group of the compounds of the formulae 1, 2, 3, 4 and 5, R" is —CN; this sub-group is known as group C below, and the compounds of this sub-group are correspondingly described by sub-formulae 1c, 2c, 3c, 4c and 5c. In the compounds of the sub-formulae 1 c, 2c, 3c, 4c and 5c, R' is as defined for the compounds of the sub-formulae 1a-5a and is preferably alkyl, alkoxy or alkenyl.

In addition to the preferred compounds of groups A, B and C, other compounds of the formulae 1, 2, 3, 4 and 5 having other variants of the proposed substituents are also customary. All these substances can be obtained by methods which are known from the literature or analogously thereto.

Besides compounds of the formula I and I*, the novel media preferably comprise one or more compounds selected from group A and/or group B and/or group C. The proportions by weight of the compounds from these groups in the novel media are preferably Group A: 0 to 90%, preferably 20 to 90%, in particular 30 to 90%

Group B: 0 to 80%, preferably 10 to 80%, in particular 10 to 65%

Group C: 0 to 80%, preferably 5 to 80%, in particular 5 to 50%, the sum of the proportions by weight of the group A and/or B and/or C compounds present in the particular novel media preferably being 5%–90% and in particular 10% to 90%.

The novel media preferably comprise 1 to 40%, particularly preferably 5 to 30%, of compounds of the formulae I and I*. Further preferred media are those which comprise more than 40%, in particular 45 to 90%, of compounds of the formulae I and I*. The media preferably comprise three, four or five compounds of the formulae I and I*.

The structure of the IPS display according to the invention corresponds to the usual construction for such displays, as described, for example, in WO 91/10936 or EP 0 588 568. The term conventional construction is broadly drawn here and also covers all derivatives and modifications of the IPS display, in particular, for example, including matrix display elements based on poly-Si TFT or MIM.

However, an essential difference between the displays according to the invention and those conventional hitherto is in the choice of the liquid-crystal parameters of the liquid-crystal layer.

The liquid-crystal mixtures which can be used in accordance with the invention are prepared in a manner conventional per se. In general, the desired amount of the components used in lesser amount is dissolved in the components making up the principal constituent, expediently at elevated temperature. It is also possible to mix solutions of the components in an organic solvent, for example in acetone, chloroform or methanol, and, after mixing, to remove the solvent again, for example by distillation.

The dielectrics may also comprise further additives known to the person skilled in the art and described in the literature. For example, 0–15% of pleochroic dyes or chiral dopants can be added.

C denotes a crystalline phase, S a smectic phase, S$_B$ a smectic B phase, N a nematic phase and I the isotropic phase.

V$_o$ denotes the capacitive threshold voltage. Δn denotes the optical anisotropy and n$_o$ the ordinary refractive index (in each case at 589 nm). Δε denotes the dielectric anisotropy (Δε=ε∥ −ε⊥, where ε∥ denotes the dielectric constant parallel to the longitudinal axes of the molecules and ε⊥ denotes the dielectric constant perpendicular thereto). The electro-optical data were measured in a planar cell at 20° C., unless expressly stated otherwise. The optical data were measured at 20° C., unless expressly stated otherwise.

The cells are dark in the "off" state.

In the present application and in the examples below, the structures of the liquid-crystal compounds are indicated by acronyms, the transformation into chemical formulae taking place as in Tables A and B below. All the radicals C$_n$H$_{2n+1}$ are straight-chain alkyl radicals containing n or m carbon atoms, respectively. The coding in Table B is self-evident. In Table A, only the acronym for the parent structure is given. In individual cases, the acronym for the parent structure is followed, separated by a hyphen, by a code for the substituents R$^1$, R$^2$, L$^1$ and L$^2$:

| Code for R$^1$, R$^2$,L$^1$,L$^2$ | R$^1$ | R$^2$ | L$^1$ | L$^2$ |
|---|---|---|---|---|
| nm | C$_n$H$_{2n+1}$ | C$_m$H$_{2m+1}$ | H | H |
| nOm | C$_n$H$_{2n+1}$ | OC$_m$H$_{2m+1}$ | H | H |
| nO.m | OC$_n$H$_{2n+1}$ | C$_m$H$_{2m+1}$ | H | H |
| n | C$_n$H$_{2n+1}$ | CN | H | H |
| nN.F | C$_n$H$_{2n+1}$ | CN | F | H |
| nN.F.F | C$_n$H$_{2n+1}$ | CN | F | F |
| nF | C$_n$H$_{2n+1}$ | F | H | H |
| nOF | OC$_n$H$_{2n+1}$ | F | H | H |
| nCl | C$_n$H$_{2n+1}$ | Cl | H | H |
| nF.F | C$_n$H$_{2n+1}$ | F | F | H |
| nCF$_3$ | C$_n$H$_{2n+1}$ | CF$_3$ | H | H |
| nOCF$_3$ | C$_n$H$_{2n+1}$ | OCF$_3$ | H | H |
| nOCF$_3$ | C$_n$H$_{2n+1}$ | OCF$_3$ | H | H |
| nOCF$_2$ | C$_n$H$_{2n+1}$ | OCHF$_2$ | H | H |
| nS | C$_n$H$_{2n+1}$ | NCS | H | H |
| rVsN | C$_r$H$_{2r+1}$—CH=CH—C$_s$H$_{2s}$— | CN | H | H |
| rEsN | C$_r$H$_{2r+1}$—O—C$_2$H$_{2s}$— | CN | H | H |
| nAm | C$_n$H$_{2n+1}$ | COOC$_m$H$_{2m+1}$ | H | H |
| nF.F.F | C$_n$H$_{2n+1}$ | F | F | F |
| nCl.F.F | C$_n$H$_{2n+1}$ | Cl | F | F |
| nCF$_3$.F.F | C$_n$H$_{2n+1}$ | CF$_3$ | F | F |
| nOCF$_3$.F.F | C$_n$H$_{2n+1}$ | OCF$_3$ | F | F |
| nOCF$_2$.F.F | C$_n$H$_{2n+1}$ | OCHF$_2$ | F | F |
| nOCF$_3$.F | C$_n$H$_{2n+1}$ | OCF$_3$ | F | H |

Preferred media comprise, in particular, one or more compounds from Tables A and B in addition to the compounds of the formulae I and I*.

TABLE A
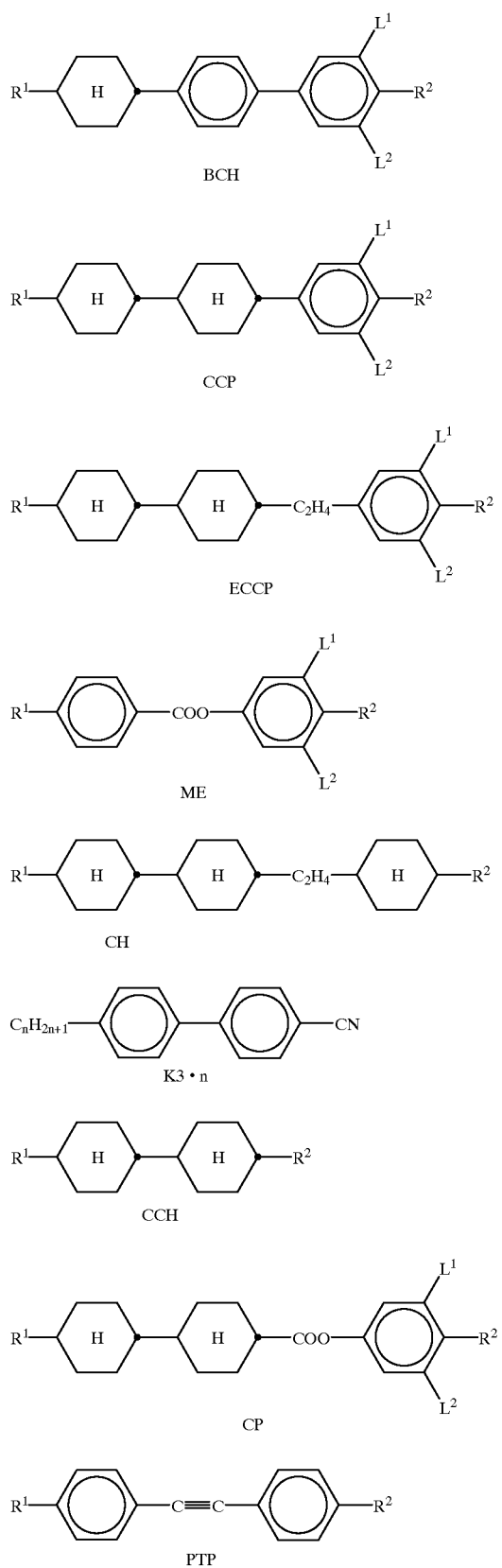
BCH
CCP
ECCP
ME
CH
K3 · n
CCH
CP
PTP
TABLE A-continued
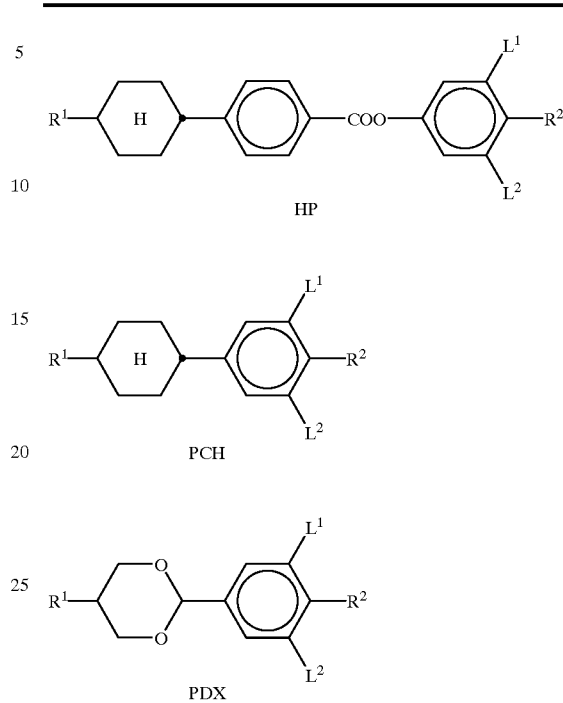
HP
PCH
PDX
TABLE B
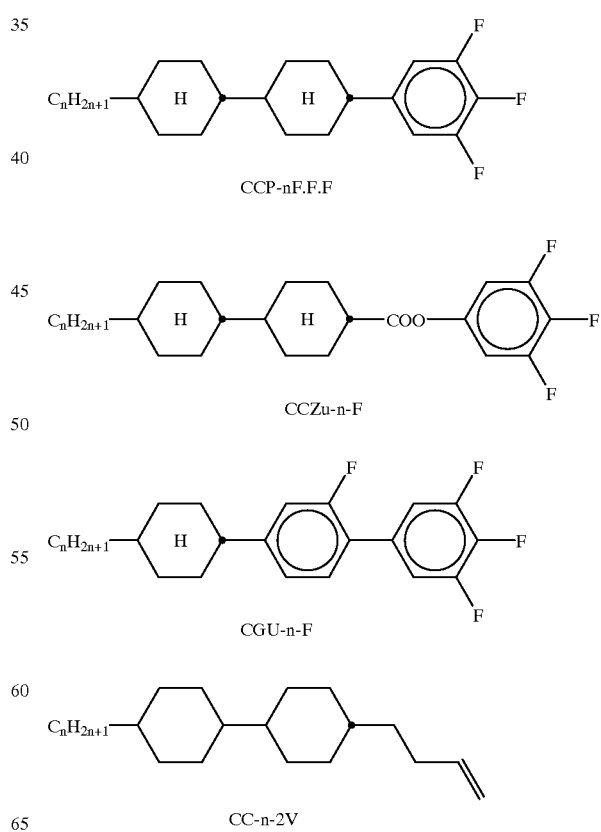
CCP-nF.F.F
CCZu-n-F
CGU-n-F
CC-n-2V

TABLE B-continued

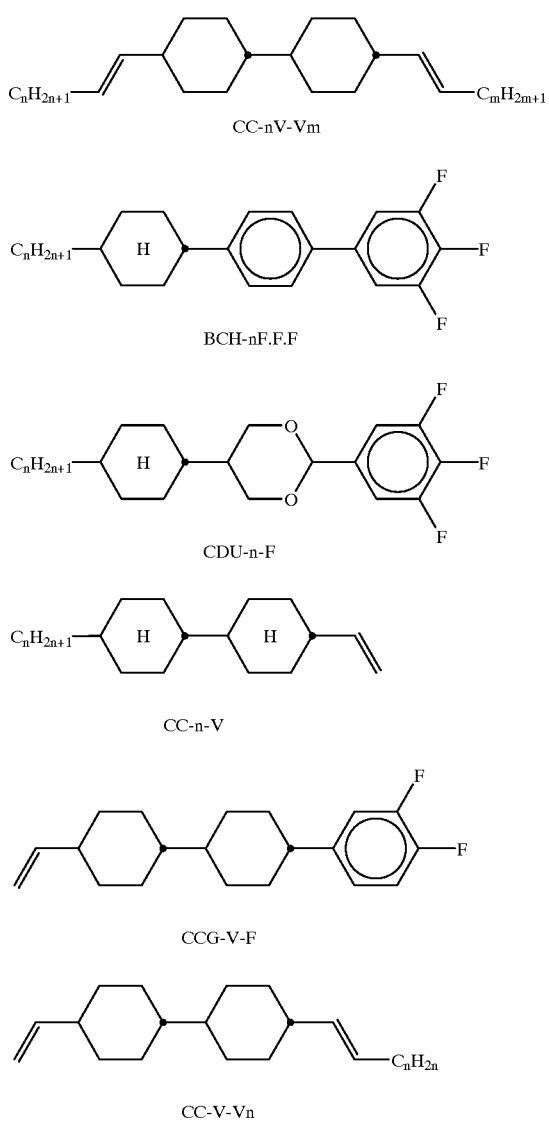

| | |
|---|---|
| CCZU-3-F | 9.0% |
| CCZU-5-F | 6.0% |
| PCH-2N.F.F | 5.0% |
| PCH-3N.F.F | 5.0% |
| PCH-5N.F.F | 4.0% |
| CC-V-V1 | 18.0% | and has high contrast and short response times.

The shelf life at $-30°$ C. up to which no crystallization of the mixture occurs is 890 hours.

In the foregoing examples, all temperatures are set forth uncorrected in degrees Celsius; and, unless otherwise indicated, all parts and percentages are by weight.

The entire disclosure of all applications, patents and publications, cited above and below, and of corresponding German application No. 197 07 807.9, filed Feb. 27, 1997 is hereby incorporated by reference.

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

What is claimed is:

1. An electro-optical liquid-crystal display comprising:
a liquid-crystal layer and a realignment layer for realigning the liquid crystals whose field has a significant component parallel to the liquid-crystal layer, wherein the liquid-crystal layer comprises a liquid crystalline medium of positive dielectric anisotropy, which comprises at least one compound of the formula I

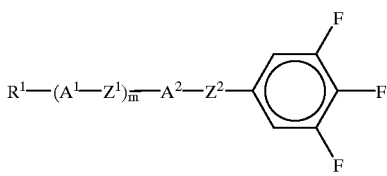

in which $R^1$ is H, an alkyl or alkenyl radical having 1 to 15 carbon atoms which is unsubstituted, monosubstituted by CN or $CF_3$, or monosubstituted to perhalosubstituted by halogen, where one or more $CH_2$ groups in these radicals, in each case independently of one another, are optionally replaced by —O—, —S—, —CO—, —CO—O—, —O—CO— or —O—CO—O in such a way that O atoms are not linked directly to one another, $A^1$ and $A^2$ are each, independently of one another, a
(a) 1,4-cyclohexenylene radical or trans-1,4-cyclohexylene radical, in which, in addition, one or more non-adjacent $CH_2$ groups are optionally replaced by —O— and/or —S—,
(b) 1,4-phenylene radical, in which, in addition, one or two CH groups are optionally replaced by N,
(c) radical from the group consisting of 1,4-dicyclo [2.2.2]octylene, piperidine-1,4-diyl, naphthaline-2,6-diyl, decahydronaphthaline-2,6-diyl and 1,2,3,4-tetrahydronaphthaline-2,6-diyl, where the radicals (a) and (b) may be substituted by one or two fluorine atoms,

EXAMPLE 1

An IPS display comprises a nematic mixture having

| | |
|---|---|
| clearing point | $+73°$ C. |
| $\Delta n$[589 nm, $20°$ C.] | 0.0768 |
| $n_O$ | 1.4732 |
| rotational viscosity ($20°$ C.) | 80 mPa · s | and comprising

| | |
|---|---|
| CCP-20CF$_3$ | 8.0% |
| CCP-30CF$_3$ | 6.0% |
| CCP-40CF$_3$ | 5.0% |
| CCP-50CF$_3$ | 5.0% |
| CCP-2F.F.F | 9.0% |
| CCP-3F.F.F | 8.0% |
| CCP-5F.F.F | 6.0% |
| CCZU-2-F | 6.0% |

$Z^1$ and $Z^2$ are each, independently of one another, —CO—O, —O—CO—, —CH$_2$O—, —OCH$_2$—CH$_2$CH$_2$—, —CH=CH—, —C≡C—, or a single bond, or one of the radicals $Z^1$ and $Z^2$ is —(CH$_2$)$_4$— or —CH=CH—CH$_2$CH$_2$—, and m is 0, 1 or 2, and at least one compound of the formula I*

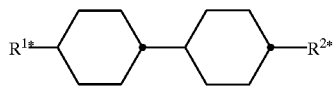

in which $R^{1*}$ and $R^{2*}$ are each independently of one another, 1E-alkenyl or 3E-alkenyl having 2–7 carbon atoms.

2. A liquid-crystal display according to claim 1, wherein the medium comprises at least one compound of the formula I*a, I*b or I*c:

in which $R^{3*}$ and $R^{4*}$ are each, independently of one another, H, CH$_3$, C$_2$H$_5$ or n—C$_3$H$_7$.

3. A liquid-crystal display according to claim 1, wherein the medium further comprises at least one compound of the formula II

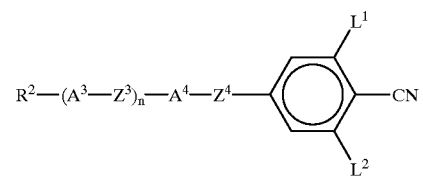

in which $L^1$ and $L^2$ are each, independently of one another, H or F, $R^2$ is as defined for $R^1$, $A^3$ and $A^4$ are each, independently, as defined for $A^1$ and $A^2$, $Z^3$ and $Z^4$ are each, independently of one another, as defined for $Z^1$ and $Z^2$, and n is 0, 1 or 2.

4. A liquid-crystal display according to claim 1, wherein the medium further comprises at least one compound of the formula III

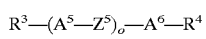

in which $R^3$ and $R^4$ are each, independently of one another, as defined for $R^1$, $A^5$ and $A^6$ are each, independently, as defined for $A^1$ and $A^2$, $Z^5$ is in each case, independently of the others, as defined for $Z^1$ and $Z^2$, and o is 1, 2 or 3.

5. A liquid-crystal display according to claim 3, wherein the medium further comprises at least one compound of the formula III

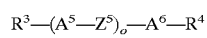

in which $R^3$ and $R^4$ are each, independently of one another, as defined for $R^1$, $A^5$ and $A^6$ are each, independently, as defined for $A^1$ and $A^2$, $Z^5$ is in each case, independently of the others, as defined for $Z^1$ and $Z^2$, and o is 1, 2 or 3.

6. A liquid-crystal display according to claim 1, wherein the medium further comprises at least one compound of the formula IV

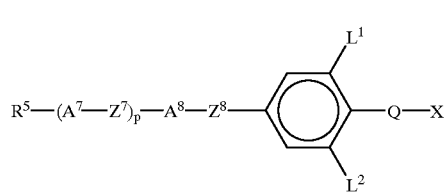

in which $R^5$ is as defined for $R^1$, $A^7$ and $A^8$ are each, independently of one another, as defined for $A^1$ and $A^2$, $Z^7$ and $Z^8$ are each, independently of one another, as defined for $Z^1$ and $Z^2$, $L^1$ and $L^2$ are each, independently of one another, H or F, Q is a polyfluoroalkylene radical of the formula

in which q is 0 or 1 r is 0 or an integer from 1 to 6 and s is an integer from 1 to 6, x is H, F or Cl, and p is 0, 1 or 2.

7. A liquid-crystal display according to claim 3, wherein the medium further comprises at least one compound of the formula,IV

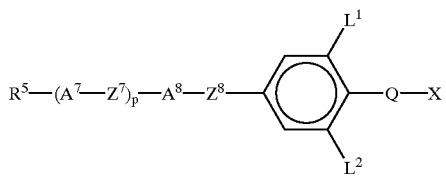

in which

R[5] is as defined for R[1],

A[7] and A[8] are each, independently of one another, as defined for A[1] and A[2], Z[7] and Z[8] are each, independently of one another, as defined for Z[1] and Z[2], L[1] and L[2] are each, independently of one another, H or F, Q is a polyfluoroalkylene radical of the formula

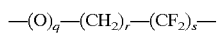

in which
q is 0 or 1
r is 0 or an integer from 1 to 6 and
s is an integer from 1 to 6, x is H, F or Cl, and p is 0, 1 or 2.

8. A liquid-crystal display according to claim 4, wherein the medium further comprises at least one compound of the formula IV

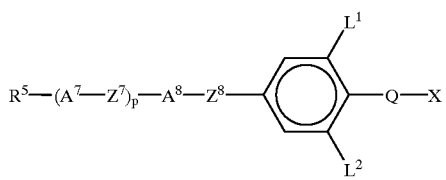

in which

R[5] is as defined for R[1],

A[7] and A[8] are each, independently of one another, as defined for A[1] and A[2], Z[7] and Z[8] are each, independently of one another, as defined for Z[1] and Z[2], L[1] and L[2] are each, independently of one another, H or F, Q is a polyfluoroalkylene radical of the formula

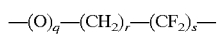

in which
q is 0 or 1
r is 0 or an integer from 1 to 6 and
s is an integer from 1 to 6, x is H, F or Cl, and p is 0, 1 or 2.

9. A liquid-crystal display according to claim 5, wherein the medium further comprises at least one compound of the formula IV

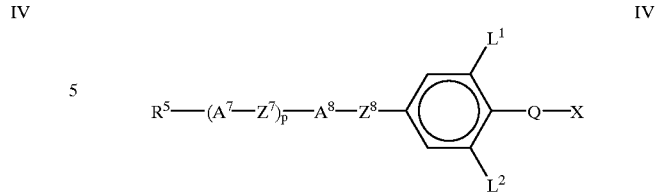

in which

R[5] is as defined for R[1],

A[7] and A[8] are each, independently of one another, as defined for A[1] and A[2], Z[7] and Z[8] are each, independently of one another, as defined for Z[1] and Z[2], L[1] and L[2] are each, independently of one another, H or F, Q is a polyfluoroalkylene radical of the formula

in which
q is 0 or 1
r is 0 or an integer from 1 to 6 and
s is an integer from 1 to 6, x is H, F or Cl, and p is 0, 1 or 2.

10. A liquid-crystal display according to claim 1, wherein the medium further comprises at least one compound of the formula IIa1

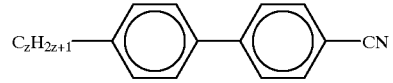

in which z is 1–12.

11. A display according to claim 1 having pixels addressed by means of an active matrix.

12. A liquid-crystalline medium of positive dielectric anisotropy, which comprises at least one compound of the formula I

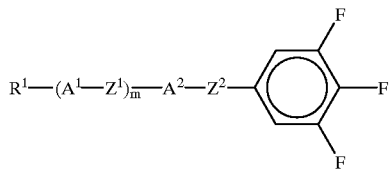

in which

R[1] is H, an alkyl or alkenyl radical having 1 to 15 carbon atoms which is unsubstituted, monosubstituted by CN or CF$_3$, or monosubstituted to perhalo-substituted by halogen, where one or more CH$_2$ groups in these radicals, in each case independently of one another, are optionally replaced by —O—, —S—, —CO—, —CO—O—, —O—CO— or —O—CO—O— in such a way that O atoms are not linked directly to one another, A[1] and A[2] are each, independently of one another, a
(a) 1,4-cyclohexenylene radical or trans-1,4-cyclohexylene radical, in which, in addition, one or more non-adjacent $CH_2$ groups are optionally replaced by —O— and/or —S—,
(b) 1,4-phenylene radical, in which, in addition, one or two CH groups are optionally replaced by N,
(c) radical from the group consisting of 1,4-dicyclo[2.2.2]octylene, piperidine-1,4-diyl, naphthaline-2,6-diyl, decahydronaphthaline-2,6-diyl and 1,2,3,4-tetrahydronaphthaline-2,6-diyl, where the radicals (a) and (b) may be substituted by one or two fluorine atoms, $Z^1$ and $Z^2$ are each, independently of one another, —CO—O—, —O—CO—, —$CH_2$O—, —O$CH_2$—$CH_2CH_2$—, —CH=CH—, —C≡C—, or a single bond, or one of the radicals $Z^1$ and $Z^2$ is —$(CH_2)_4$— or —CH=CH—$CH_2CH_2$—, and m is 0, 1 or 2, at least one compound of the formula I*

in which
$R^{1*}$ and $R^{2*}$ are each independently or one another, 1E-alkenyl or 3E-alkenyl having 2–7 carbon atoms, optionally at least one compound of the formula II

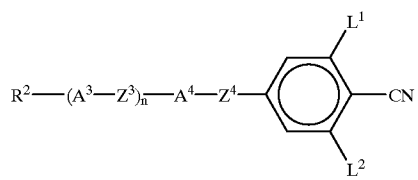

in which
$L^1$ and $L^2$ are each, independently of one another, H or F,
$R^2$ is as defined for $R^1$,
$A^3$ and $A^4$ are each, independently, as defined for $A^1$ and $A^2$,
$Z^3$ and $Z^4$ are each, independently of one another, as defined for $Z^1$ and $Z^2$, and
n is 0, 1 or 2, optionally at least one compound of the formula III

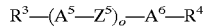

in which
$R^3$ and $R^4$ are each, independently of one another, as defined for $R^1$,
$A^5$ and $A^6$ are each, independently, as defined for $A^1$ and $A^2$,
$Z^5$ is in each case, independently of the others, as defined for $Z^1$ and $Z^2$, and
o is 1, 2 or 3, and optionally at least one compound of the formula IV

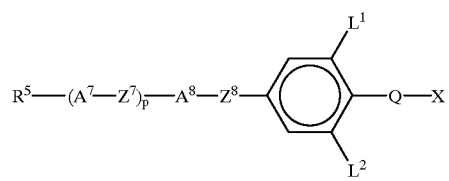

in which
$R^5$ is as defined for $R^1$,
$A^7$ and $A^8$ are each, independently of one another, as defined for $A^1$ and $A^2$,
$Z^7$ and $Z^8$ are each, independently of one another, as defined for $Z^1$ and $Z^2$,
$L^1$ and $L^2$ are each, independently of one another, H or F,
Q is a polyfluoroalkylene radical of the formula —$(O)_q$—$(CH_2)_r$—$(CF_2)_s$— in which
q is 0 or 1
r is 0 or an integer between 1 and 6 and
s is an integer between 1 and 6,
x is H, F or Cl, and
p is 0, 1 or 2.

13. A liquid-crystalline medium of claim 12, which contains at least one compound of the formula II

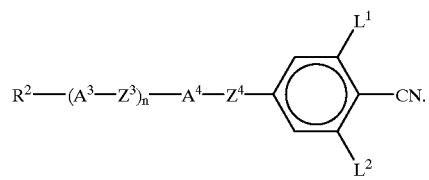

14. A liquid-crystalline medium of claim 12, which contains at least one compound of the formula III

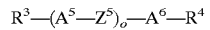

15. A liquid-crystalline medium of claim 12, which contains at least one compound of the formula IV

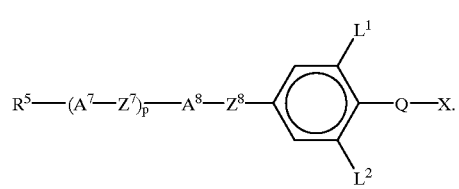

16. A liquid-crystalline medium according to claim 12, which comprises
from 10 to 60% by weight, of at least 5 one compound of the formula I,
from 5 to 40% by weight, of at least one compound of the formula I*,
from 0 to 40% by weight, of at least one compound of the formula II,
from 0 to 30% by weight, of at least one compound of the formula III, from 5 to 50% by weight, of at least one compound of the formula IV.

17. A liquid-crystalline medium according to claim 12, which comprises from 30 to 60% by weight, of at least one compound of the formula I, from 10 to 25% by weight, of at least one compound of the formula I*, from 0 to 25% by weight, of at least one compound of the formula II, from 0 to 15% by weight, of at least one compound of the formula III, from 10 to 30% by weight, of at least one compound of the formula IV.

18. A liquid-crystalline medium according to claim 12, which comprises:

at least one compound selected from the formulae Ia and/or Ib

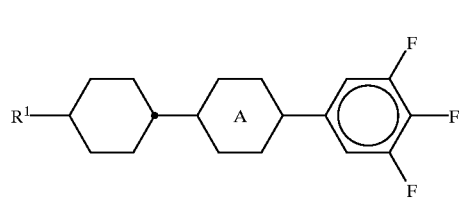
Ia

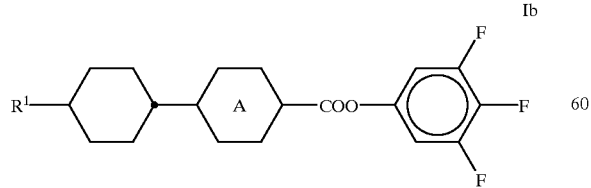
Ib optionally, at least one compound selected from the formulae IIa, IIb, IIc and IId,

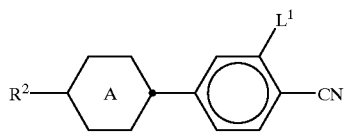
IIa

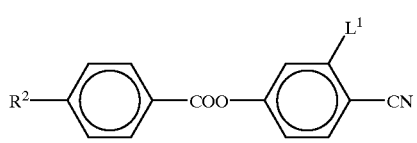
IIb

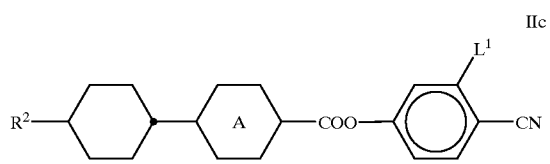
IIc

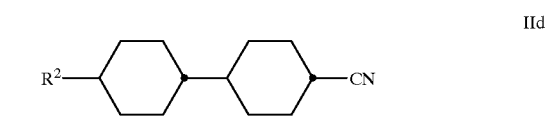
IId optionally, at least one compound selected from the formulae IIIa, IIIb and IIIc,

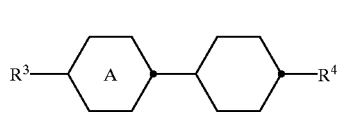
IIIa

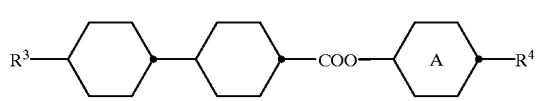
IIIb

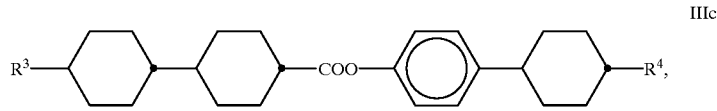
IIIc, at least one compound selected from the formulae IVa and IVb,

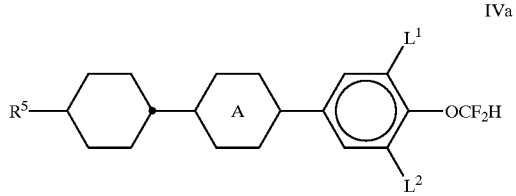
IVa

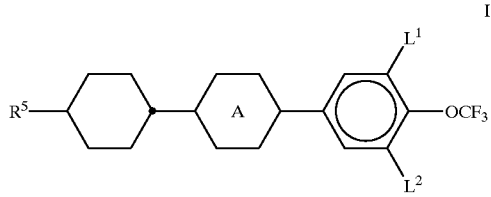
IVb in which

-continued
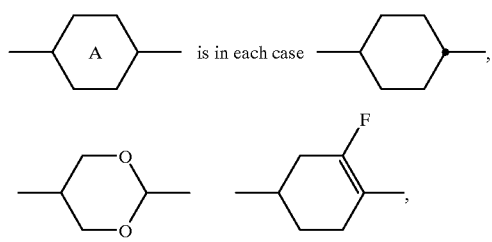
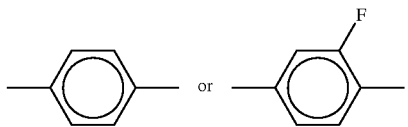
and $R^1$, $R^2$, $R^3$, $R^4$, $R^5$, $L^1$ and $L^2$ are each as defined above.
* * * * *